US012747751B2

(12) United States Patent
Bargav R et al.

(10) Patent No.: US 12,747,751 B2
(45) Date of Patent: Sep. 29, 2026

(54) ENGINE CRANKSHAFT ASSEMBLIES WITH GEAR INTERFACES

(71) Applicant: GM GLOBAL TECHNOLOGY OPERATIONS LLC, Detroit, MI (US)

(72) Inventors: Suman Bargav R, Bengaluru (IN); Durga Prasad Kandula, Bangalore (IN); Peng Chen, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 296 days.

(21) Appl. No.: 18/612,086

(22) Filed: Mar. 21, 2024

(65) Prior Publication Data

US 2025/0297639 A1 Sep. 25, 2025

(51) Int. Cl.

*F16C 3/08* (2006.01)
*F16D 3/06* (2006.01)
*F16H 55/17* (2006.01)

(52) U.S. Cl.

CPC .................. *F16C 3/08* (2013.01); *F16D 3/06* (2013.01); *F16H 55/17* (2013.01); *F16C 2360/22* (2013.01)

(58) Field of Classification Search

CPC .......... F16C 3/08; F16C 2360/22; F16C 3/06; F16C 3/10; F16C 3/20; F16D 3/06; F16D 1/092; F16H 55/17; F16H 57/0025; F02B 77/00; F16F 15/26; F16F 15/283

See application file for complete search history.

(56) References Cited

U.S. PATENT DOCUMENTS 1,367,500 A * 2/1921 Redmon ................. F16D 1/092 403/333
1,648,200 A * 11/1927 Schulze .............. F16H 57/0025 403/333
1,690,296 A * 11/1928 Hirth ......................... F16C 3/12 301/128
2,340,747 A 2/1944 Hansen (Continued)

FOREIGN PATENT DOCUMENTS

CN 209041317 U * 6/2019
DE 860333 B 12/1952
DE 2203425 A 12/1972

(Continued)

OTHER PUBLICATIONS

Machine translation of CN 209041317 U, obtained from FIT database (Year: 2019).*

(Continued)

*Primary Examiner* — Thomas C Diaz
(74) *Attorney, Agent, or Firm* — Quinn IP Law

(57) ABSTRACT

A crankshaft assembly includes a crankshaft body extending along an axis of rotation. The crankshaft body includes bearing journals that are mutually coaxial with the axis of rotation and spaced from each other along a length of the crankshaft body and crankpins that are spaced from each other along the length of the crankshaft body and axially offset from the axis of rotation. The crankshaft body also includes crank webs projecting radially from the axis of rotation and interconnecting the bearing journals and the crankpins and a flange extending from a distal end of the crankshaft body having a conical gear engaging surface.

20 Claims, 3 Drawing Sheets

(56) References Cited

U.S. PATENT DOCUMENTS 4,730,512 A * 3/1988 Ito .......................... F02B 75/22
123/192.1

FOREIGN PATENT DOCUMENTS

| | | | | |
|---|---|---|---|---|
| DE | 10343993 | A1 | | 5/2005 |
| DE | 102017102511 | A1 | | 8/2017 |
| DE | 112015005109 | T5 | | 8/2017 |
| DE | 102016223098 | A1 | | 5/2018 |
| JP | 2002235838 | A | * | 8/2002 |

OTHER PUBLICATIONS

Machine translation of JP 2002235838 A, obtained from fit database (Year: 2002).*

* cited by examiner

ENGINE CRANKSHAFT ASSEMBLIES WITH GEAR INTERFACES

INTRODUCTION

The present disclosure relates generally to torque transmitting shafts. More specifically, aspects of this disclosure relate to crankshaft assemblies for internal combustion engines.

In automotive applications, for example, a vehicle powertrain is generally typified by a prime mover that delivers driving torque through an automatic or manually shifted power transmission to the vehicle's final drive system (e.g., differential, axle shafts, road wheels, etc.). The prime mover for automobiles may include a reciprocating-piston type internal combustion engine (ICE) with the engine's crankshaft converting reciprocating linear movement of the engine pistons into rotational movement that is output as drive torque to propel the vehicle.

SUMMARY

Disclosed herein is a crankshaft assembly. The crankshaft assembly includes a crankshaft body extending along an axis of rotation. The crankshaft body includes bearing journals that are mutually coaxial with the axis of rotation and spaced from each other along a length of the crankshaft body and crankpins that are spaced from each other along the length of the crankshaft body and axially offset from the axis of rotation. The crankshaft body also includes crank webs projecting radially from the axis of rotation and interconnecting the bearing journals and the crankpins and a flange extending from a distal end of the crankshaft body having a conical gear engaging surface.

Another aspect of the disclosure may be where the conical gear engaging surface tapers towards the distal end of the crankshaft body.

Another aspect of the disclosure may be where the conical gear engaging surface extends between five and fifteen degrees relative to the axis of rotation.

Another aspect of the disclosure may be where the flange includes a first axially facing surface and a second axially facing surface and the conical gear engaging surface extends from the first axially facing surface to the second axially facing surface.

Another aspect of the disclosure may include a gear having a conical flange engaging surface complementary to the conical gear engaging surface.

Another aspect of the disclosure may be where the gear includes helical teeth extending from a radially outer surface of the gear.

Another aspect of the disclosure may be where the helical teeth on the gear are right direction helical teeth.

Another aspect of the disclosure may be where each of the plurality of bearing journals define a journal cavity therein.

Another aspect of the disclosure may be where each of the plurality of crankpins define a crankpin cavity therein.

Another aspect of the disclosure may be where each of the plurality of crank webs define a web cavity therein.

Disclosed herein is a method of manufacturing a crankshaft assembly. The method includes forming a crankshaft body along an axis of rotation. The crankshaft body includes bearing journals that are mutually coaxial with the axis of rotation and spaced from each other along a length of the crankshaft body and crankpins that are spaced from each other along the length of the crankshaft body and axially offset from the axis of rotation. The crankshaft body also includes crank webs projecting radially from the axis of rotation and interconnecting the bearing journals and the crankpins and a flange extending from a distal end of the crankshaft body having a conical gear engaging surface.

Another aspect of the disclosure may be where the conical gear engaging surface tapers towards the distal end of the crankshaft body.

Another aspect of the disclosure may be where the conical gear engaging surface extends between five and fifteen degrees relative to the axis of rotation.

Another aspect of the disclosure may be where the flange includes a first axially facing surface and a second axially facing surface and the conical gear engaging surface extends from the first axially facing surface to the second axially facing surface.

Another aspect of the disclosure may include a gear having a conical flange engaging surface complementary to the conical gear engaging surface.

Disclosed herein is a motor vehicle. The motor vehicle includes a vehicle body, road wheels rotatably attached to the vehicle body, and an internal combustion engine (ICE) assembly attached to the vehicle body. The ICE assembly is operable to output engine torque to one or more of the road wheels to thereby propel the motor vehicle. The ICE assembly includes an engine block defining cylinder bores, pistons each reciprocally movable within a respective one of the cylinder bores, and a crankshaft assembly. The crankshaft assembly includes a crankshaft body extending along an axis of rotation. The crankshaft body includes bearing journals that are mutually coaxial with the axis of rotation and spaced from each other along a length of the crankshaft body and crankpins that are spaced from each other along the length of the crankshaft body and axially offset from the axis of rotation. The crankshaft body also includes crank webs projecting radially from the axis of rotation and interconnecting the bearing journals and the crankpins and a flange extending from a distal end of the crankshaft body having a conical gear engaging surface.

Another aspect of the disclosure may be where the conical gear engaging surface tapers towards the distal end of the crankshaft body.

Another aspect of the disclosure may be where the conical gear engaging surface extends between five and fifteen degrees relative to the axis of rotation.

Another aspect of the disclosure may be where the flange includes a first axially facing surface and a second axially facing surface and the conical gear engaging surface extends from the first axially facing surface to the second axially facing surface.

Another aspect of the disclosure may include a gear having a conical flange engaging surface complementary to the conical gear engaging surface.

Figure 1:
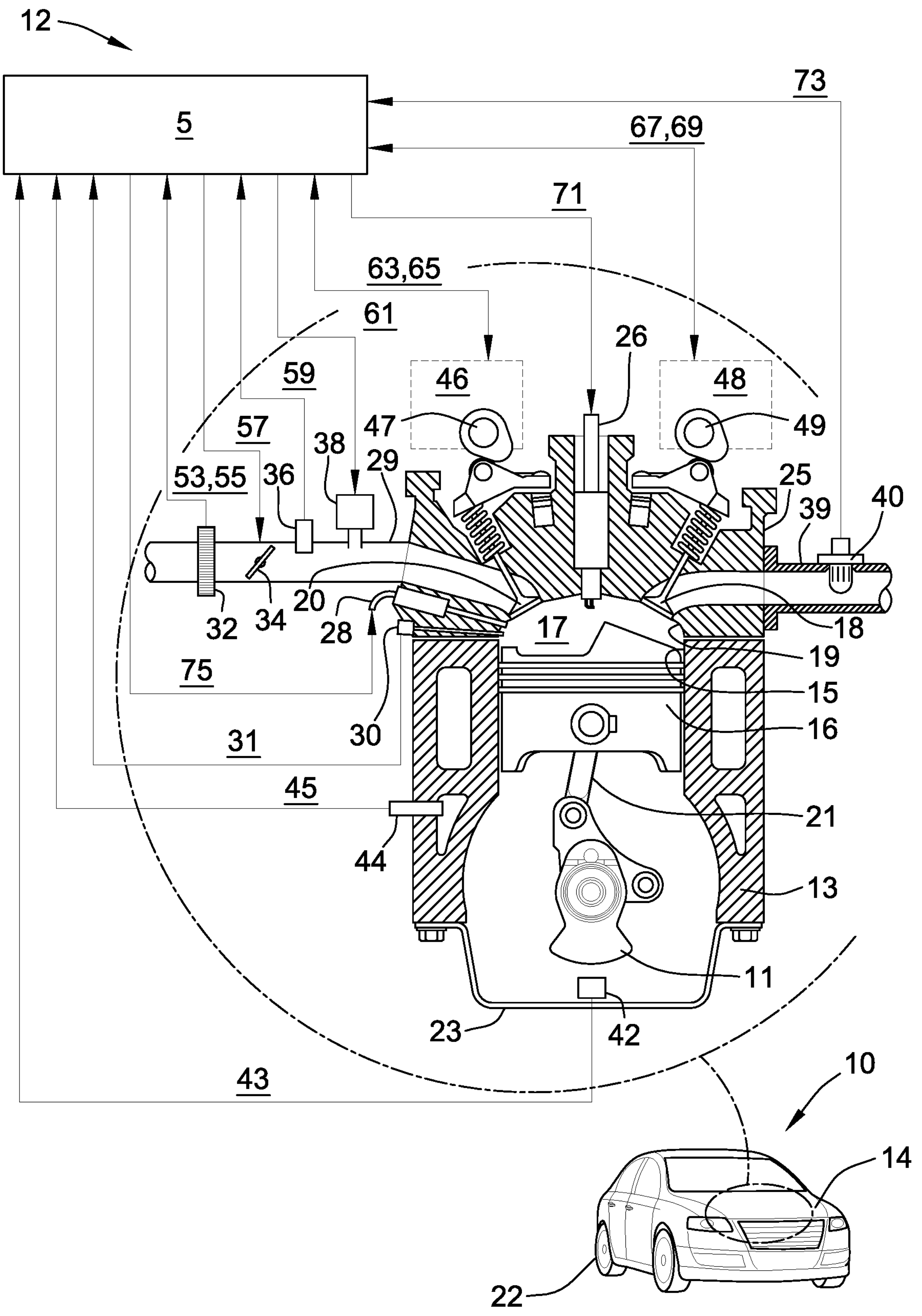
FIG. 1 is a front, perspective-view illustration of a representative motor vehicle with an inset schematic illustration of a representative reciprocating-piston type internal combustion engine assembly with an engine crankshaft having an internal stiffening structure in accord with aspects of the present disclosure.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a perspective-view illustration of a representative automobile, which is designated generally at 10 and portrayed herein for purposes of discussion as an engine-propelled, sedan-style passenger vehicle body. The illustrated automobile 10—also referred to herein as "motor vehicle" or "vehicle" for short—is merely an exemplary application with which novel aspects of this disclosure may be practiced. In the same vein, implementation of the present concepts into a gasoline engine should also be appreciated as an exemplary application of the novel concepts disclosed herein. As such, it will be understood that features of the present disclosure may be applied to other engine configurations, implemented by alternative powertrain architectures, and utilized for logically relevant vehicular and non-vehicular application. Lastly, select components of the automobile and internal combustion engine have been shown and will be described in additional detail herein. Nevertheless, the vehicles and engines discussed below may include numerous additional and alternative features, and other available peripheral components for carrying out the various methods and functions of this disclosure.

FIG. 1 illustrates an example of a twin-cam, inline-type engine assembly 12 that is mounted inside an engine bay 14 of the vehicle body. The illustrated engine assembly 12 is a four-stroke, reciprocating-piston engine configuration that operates to propel the automobile 10, for example, as a direct injection (DI) gasoline engine, including flexible-fuel vehicle (FFV) and hybrid electric vehicle (HEV) variations thereof. The engine assembly 12 can optionally operate in an assortment of selectable combustion modes, including a homogeneous-charge compression-ignition (HCCI) combustion mode and an adjustable-lift spark-ignition (SI) combustion mode. Although not explicitly portrayed in FIG. 1, it is envisioned that the vehicle driveline may take on various available configurations, including front wheel drive (FWD) layouts, rear wheel drive (RWD) layouts, all-wheel drive (AWD) layouts, four-wheel drive (4WD) layouts, etc.

The engine assembly 12 employs a series of reciprocating pistons 16 that are slidably movable within cylinder bores 15 of an engine block 13. Engine pistons 16 are typically provided in even numbers of 4, 6, 8, etc., and arranged in a V-type or I-type configuration. The top surface of each piston 16 cooperates with the inner periphery of its corresponding cylinder 15 and a respective chamber surface 19 of a cylinder head 25 to define a variable-volume combustion chamber 17. Each piston 16 is connected by a respective connecting rod 21 and optional linkages to a crankpin (FIG. 2) of a rotating crankshaft 11. The crankshaft 11, in turn, transforms the linear reciprocating motion of the pistons 16 to rotational motion that is output, for example, as a number of rotations per minute (RPM) to a power transmission (not shown) to drive one or more road wheels 22. The crankshaft 11 is shown packaged within a crankcase 23 mounted underneath the engine block 13. While shown as discrete parts, the engine block 13 and cylinder head 25 may be integrally formed as single-piece, unitary "monobloc" construction.

An air intake system transmits intake air to the cylinders 15 through an intake manifold 29, which directs and distributes air into the combustion chambers 17 via intake runners of the cylinder head 25. The engine's air intake system has airflow ductwork and various electronic devices for monitoring and regulating incoming air flow. The air intake devices can include, as a non-limiting example, a mass airflow sensor 32 for monitoring mass airflow (MAF) 53 and intake air temperature (IAT) 55. A throttle valve 34 controls airflow to the engine assembly 12 in response to a control signal (ETC) 57 from a programmable engine control unit (ECU) 5. A pressure sensor 36 in the intake manifold 29 monitors, for instance, manifold absolute pressure (MAP) 59 and barometric pressure.

An optional external flow passage (not shown) recirculates exhaust gases from engine exhaust to the intake manifold 29, employing an exhaust gas recirculation (EGR) valve 38 to meter the volume of recirculated exhaust introduced back into the cylinders 15. The programmable engine control unit 5 controls mass flow of exhaust gas to the intake manifold 29 by controlling opening/closing of the EGR valve 38 via EGR command 61. In FIG. 1, the arrows connecting ECU 5 with the various components of the engine assembly 12 are emblematic of electronic signals or other communication exchanges by which data and/or control commands are transmitted from one component to the other.

Airflow from the intake manifold 29 into the combustion chamber 17 is controlled by one or more intake engine valves 20. Evacuation of exhaust gases out of the combustion chamber 17 to an exhaust manifold 39 is controlled by one or more exhaust engine valves 18. These engine valves 18, 20 are illustrated herein as spring-biased poppet valves; however, other commercially available types of engine valves may be employed. The representative engine assembly's 12 valve train system is equipped to control and adjust the opening and closing of the exhaust and intake engine valves 18, 20. While shown with a single pair of engine valves, it should be appreciated that each cylinder 15 may be equipped with multiple pairs of intake/exhaust engine valves.

Activation of the engine valves 18, 20 may be modulated by controlling exhaust and intake variable cam phasing/variable lift control (VCP/VLC) devices 46 and 48. These VCP/VLC devices 46, 48 are operable to control an intake camshaft 47 and an exhaust camshaft 49. Rotation of the intake and exhaust camshafts 47, 49 are linked and indexed to rotation of the crankshaft, thus linking openings and closings of the intake and exhaust valves 20, 18 to positions of the crankshaft 11 and the pistons 16. The intake VCP/VLC device 46 may variably switch and control valve lift of the intake valve(s) 20 in response to a control signal (iVLC) 63, and variably adjust and control phasing of the intake camshaft 47 for each cylinder 15 in response to a control signal (iVCP) 65. Exhaust VCP/VLC device 48 may variably switch and control valve lift of the exhaust valve(s) 18 in response to a control signal (eVLC) 67, and variably adjust and control phasing of the exhaust camshaft 49 for each cylinder 15 in response to a control signal (eVCP) 69.

With continuing reference to the representative configuration of FIG. 1, engine assembly 12 employs a DI fuel injection subsystem with multiple high-pressure electronic fuel injectors 28 that inject pulses of fuel directly into the combustion chambers 17. As shown, each cylinder 15 is provided with one or more fuel injectors 28 that activate in response to an injector pulse width command (INJ_PW) 75 from the ECU 5. These fuel injectors 28 are supplied with pressurized fuel by a fuel distribution system. The fuel injectors 28 may be operable, when activated, to inject multiple fuel pulses per working combustion cycle into a corresponding one of the engine cylinders 15. Engine assembly 12 employs a compression-ignition procedure (for diesel engine architectures) or a spark-ignition procedure (for gasoline engine architectures) by which fuel-combustion-initiating energy, such as an abrupt electrical discharge provided via a spark plug 26 in response to a spark command (IGN) 71, ignites cylinder charges in the combustion chambers 17. Fuel injectors 28 may also take on the form of an electronically controlled, common-rail fuel injector architecture that operates with a normally-off solenoid-driven mode of operation.

The engine assembly 12 is equipped with a variety of sensing devices for monitoring engine operation, including a crank sensor 42 that monitors crankshaft rotational position and outputs a crank angle/speed (RPM) signal 43. A temperature sensor 44 monitors, for example, one or more engine-related temperatures (e.g., coolant temp, oil, etc.) and outputs a signal 45 indicative thereof. An in-cylinder combustion sensor 30 monitors combustion-related variables, such as in-cylinder combustion pressure, charge temperature, fuel mass, air-to-fuel ratio, etc., and outputs a signal 31 indicative thereof. An exhaust gas sensor 40 monitors one or more exhaust gas-related variables, e.g., actual air/fuel ratio (AFR), burned gas fraction, etc., and outputs a signal 73 indicative thereof.

Figure 2:
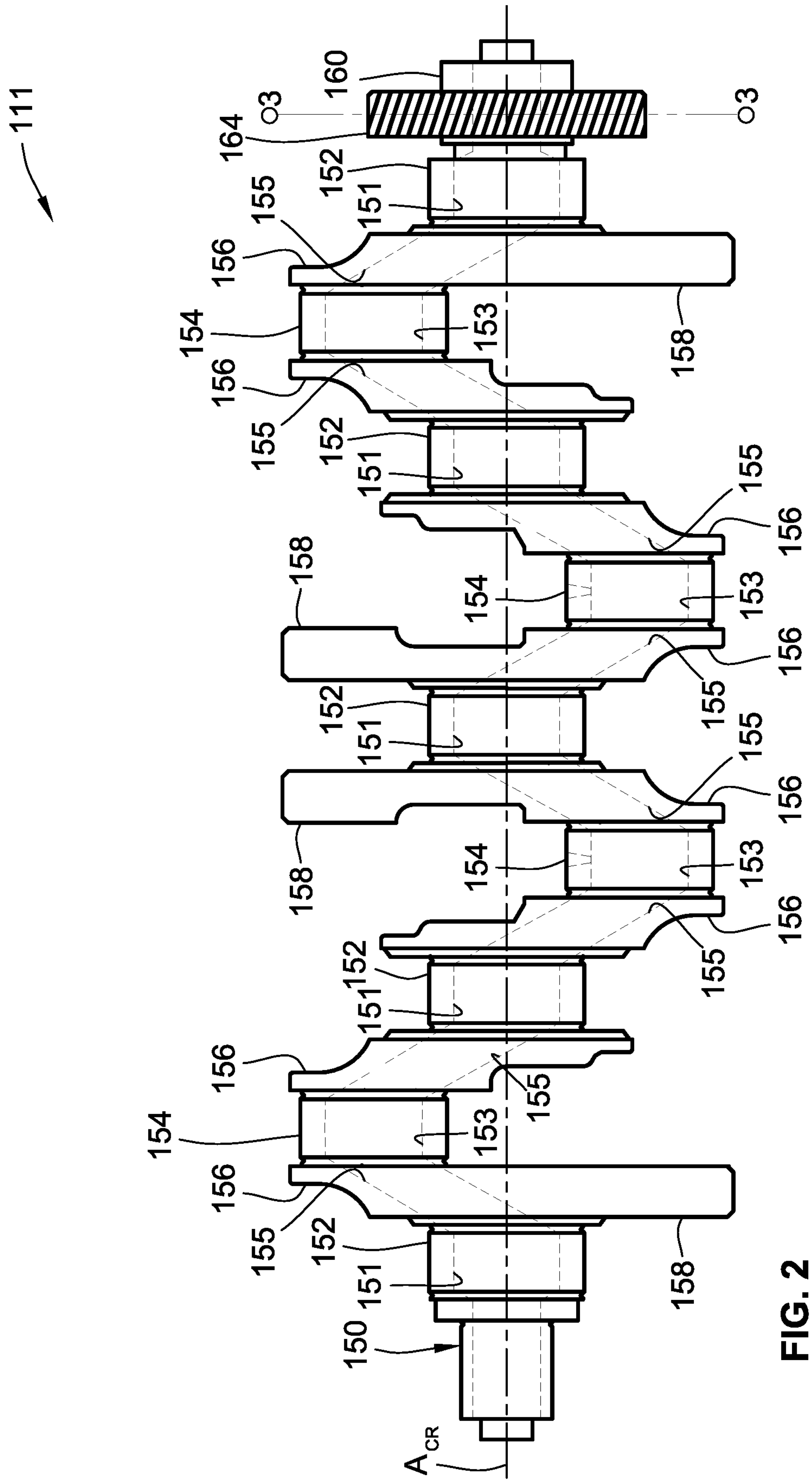
FIG. 2 is a side-view illustration of a representative engine crankshaft assembly with an I-beam core stiffener in accordance with aspects of the present disclosure.

Turning next to FIG. 2, there is shown a representative crankshaft assembly 111. The crankshaft assembly 111 may be implemented for vehicular applications, such as the crankshaft 11 in engine assembly 12 of FIG. 1, as well as non-vehicular applications, such as reciprocating compressors, oilwell pumps, etc. The crankshaft assembly 111, for example, includes an elongated, non-linear crankshaft body 150 that extends along a central crankshaft axis ACR on which the crankshaft assembly 111 rotates. The crankshaft body 150 is generally defined by a series of main bearing journals 152, a series of crankpins (or "rod bearing journals") 154 interleaved with the bearing journals 152, a series of crank webs (or "arms") 156 interconnecting the bearing journals 152 with the crankpins 154, and an optional set of counterweights 158 coupled to or integral with select crank webs 156. As shown, the crankshaft body 150, including the bearing journals 152, crankpins 154, and crank webs 156, is integrally formed as a single-piece, unitary structure.

Main bearing journals 152 are coaxially aligned with one another, each concentric with the crankshaft axis ACR. During rotation on the crankshaft axis ACR, the main bearing journals 152 may ride on complementary bearing bushings (not shown) that are held in an engine crankcase of an internal combustion engine assembly (e.g., crankcase 23 of FIG. 1). FIG. 2 illustrates five main bearing journals 152 that are cylindrical structures, which share a common width and diameter and are spaced from one another along the longitudinal length of the crankshaft body 150. Each bearing journal 152 may have a hollow construction with an internal journal cavity 151 that extends axially through the center of the bearing journal 152. In particular, each optional journal cavity 151 may extend completely through a respective main bearing journal 152 with axially spaced cavity openings on an engine-side (first) axial face and a transmission-side (second) face of the journal 152. Optional configurations may comprise greater or fewer than five main bearing journals, main bearing journals with similar or distinct structures to what is shown, and main bearing journals with or without internal cavities or with cavities that are countersunk.

With continuing reference to FIG. 2, the crankshaft assembly 111 may be particularly adapted for an inline four-cylinder (14) engine and, thus, includes four crankpins 154, eight connecting webs 156, and four counterweights 158. Each of the crankpins 154 supports thereon a rod bearing (e.g., plain bearing shells) and functions as an attachment point to which a piston connecting rod (e.g., connecting rod 21 of FIG. 1) attaches a piston (e.g., engine pistons 16) to the crankshaft assembly 111. Similar to the main bearing journals 152, the crankpins 154 are spaced from each other along the longitudinal length of the crankshaft body 150. In contrast to the bearing journals 152, the crankpins 154 are not concentric with the crankshaft axis ACR; rather, a centerline of each crankpin 154 is radially spaced (i.e., "axially offset") from the crankshaft axis ACR such that the crankpins 154 orbit around the crankshaft axis ACR during rotation of the assembly 111. As used herein, the term "cavity" may be used to refer to a structural void, including through-holes, countersunk holes, cylindrical hollow cores, recessed cavities, geometrically complementary holes, centerline and axially offset cores, etc.

Each crankpin 154 may be structurally identical, sharing a common cylindrical construction with a hollow core defined by an internal crankpin cavity 153 that extends axially through the center of the crankpin 154. Specifically, each optional crankpin cavity 153 may extend completely through a respective crankpin 154 with one cavity opening on an engine-side (first) axial face and another cavity opening on a transmission-side (second) axial face of the crankpin 154. The crankshaft body 150 may comprise greater or fewer than four rod bearing journals, may comprise rod bearing journals with similar or distinct structures to what is shown, and may comprise rod bearing journals with or without internal cavities. To that end, the crankshaft assembly 111 may be configured for other engine styles and architectures, including alternative single-cylinder-bank inline layouts, multi-cylinder-bank (V) style layouts, V and I engines having six, eight, ten, etc. cylinders, or inline and rotary style engines having three, five, seven, etc., cylinders.

Physically coupling the main bearing journals 152 with the crankpins 154 is a succession of crank webs 156 that is interleaved with and sandwiched between the journals 152 and crankpins 154. Each crank web 156 is an oblong structure that projects radially outward from the crankshaft axis ACR and extends from a bearing journal 152 to a crankpin 154. These crank webs 156 may be structurally identical to one another or, alternatively, one subset of the crank webs 156 may share one matching construction whereas another subset of the crank webs 156 may share a different matching construction. As yet a further option, the eight crank webs 156 and their corresponding crankpins 154 may be aligned along a single plane; otherwise, the crankpins 154 and crank webs 156 may be disposed in multiple planes and, thus, are circumferentially spaced around the crankshaft axis ACR. When the crankshaft body 150 of FIG. 2 is formed, the crank webs 156 cover the facing open ends of the journal cavities 151 and the open ends of the web cavities 155.

Connecting the internal journal cavities 151 of the main bearing journals 152 and the internal crankpin cavities 153 of the crankpins 154 are internal web cavities 155 that extend through the crank webs 156. Similar to the journal and crankpin cavities 151, 153, each optional web cavity 155 may extend completely through a respective crank web 156 with axially opposing cavity openings located on engine-side (first) and transmission-side (second) faces of the crank web 156. In contradistinction with the crankpin and web cavities 153, 155, which are shown with constant diameters and centerline "origin" axes that are parallel to the crankshaft axis ACR, the internal web cavities 155 are obliquely angled with respect to the crankshaft axis ACR and have varying transverse cross-sections that change along the length of the crankshaft body 150.

To help mitigate the torsional and shear forces acting on the main bearing journals 152 and thereby improve the operational life expectancy of the crankshaft supporting bearings, a set of counterweights 158 may be attached to the crankshaft body 150 and extend radially away from the crankshaft axis ACR. As shown, each counterweight is a semi-circular structure that is integrally formed with a respective crank web 156, projecting from the crankshaft body 150 on a side thereof opposite the web 156 and its mated crankpin 154. These counterweights 158 help to offset the reciprocating masses of the pistons, piston rings, piston pins, retaining clips, and the upper part of the connecting rod as well as the rotating mass of the lower part of the connecting rod, bearings and crankshaft assembly 111. Since the crank webs 156 are structural members of the crankshaft body 150 physically connecting the main and rod bearing journals, whereas the counterweights 158 may be designed to reduce bearing loads and balance engine vibrations, the crankshaft body 150 may have a number of counterweight structures attached to the various segments in different combination.

As noted above, the crankshaft body 150 is fabricated with a rigid material having a relatively low weight and modulus of elasticity. For instance, the crankshaft body 150 may be formed, in whole or in part, from aluminum, aluminum alloy, titanium, or nodular iron.

Figure 3:
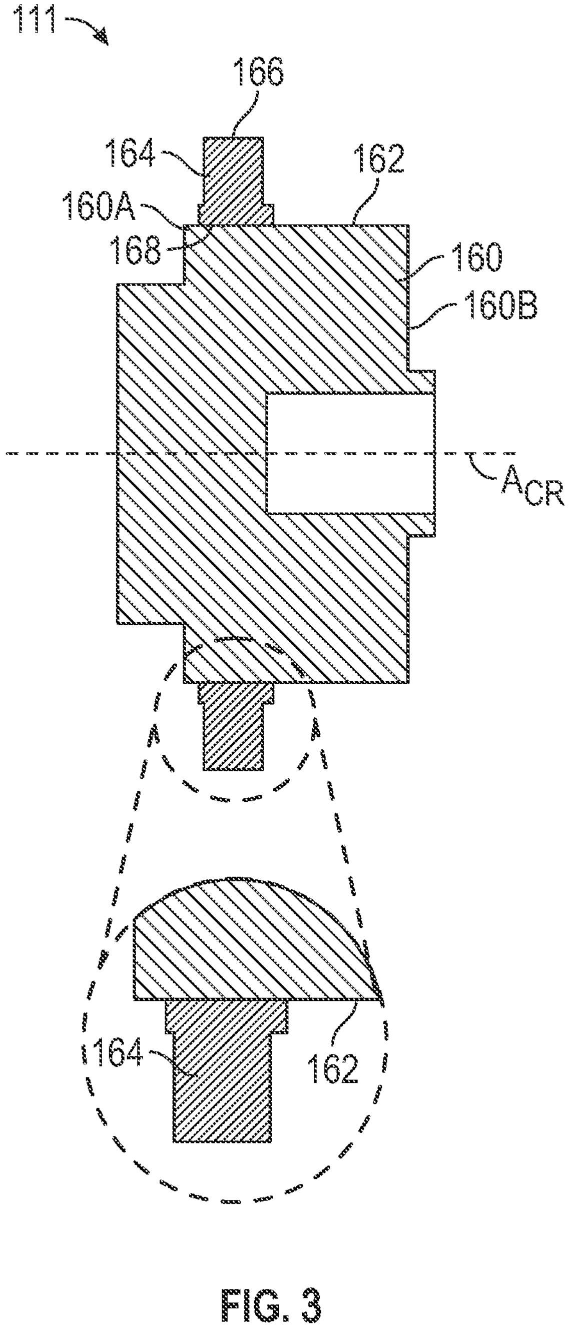
FIG. 3 is a cross-sectional view of a crankshaft taken along line 3-3 of FIG. 2.

FIG. 3 illustrates a cross-sectional view of the crankshaft 111 taken along line 3-3 of FIG. 2. In the illustrated example, the crankshaft 111 includes a distal end having a flange 160. The flange 160 includes a radially outer surface 162 relative to the axis ACR. The radially outer surface 162 extends from a first axially facing surface 160A to a second axially facing surface 160B and tapers from the first axially facing surface 160A to the second axially facing surface 160B.

Figure 4:
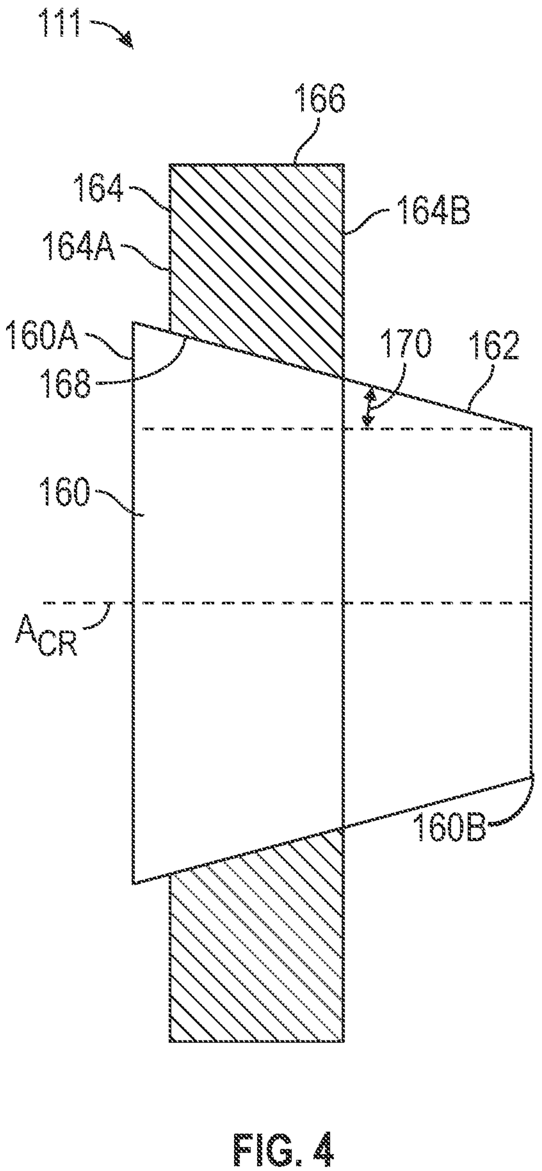
FIG. 4 is an exaggerated cross-sectional view of the crankshaft of FIG. 3 illustrating an outer surface of a flange on the crankshaft.

A gear 164, such as an oil pump drive gear, is press fit onto the flange 160 with a radially inner surface 168 of the gear 164 engaging the radially outer surface 162 of the flange 160 and a radially outer surface having helical teeth 166. The gear 164 includes a first axially facing surface 164A and a second axially facing surface 164B. FIG. 4 exaggerates the radially outer surface 162 for ease of illustration. As shown in FIG. 4, the radially outer surface 162 includes a conical shape such that it defines a conical gear engaging surface that engages a complementary conical surface on the radially inner surface 168 of the gear 164 defining a conical flange engaging surface.

In the illustrated example, the radially outer surface 162 extends at an angle 170 of greater than or equal to five degrees and less than or equal to fifteen degrees relative to a line parallel to the axis of rotation ACR of the crankshaft 111. In one example, the radially outer surface 162 does not include a step or protrusion to engage an axial face of the gear 164 such that the radially outer surface 162 of the flange 160 includes a continuous slope or conical shape between the first axially facing surface 160A and second axially facing surface 160B. The elimination of the step or projection on the radially outer surface 162 of the flange 160 can reduce a stress concentration region in the crankshaft 111 and reduce the rotational mass of the crankshaft 111.

Additionally, when the gear 164 includes a set of right direction helical teeth 166 that drives a gear (not shown) with a set of left helical teeth, the forces between the helical teeth bias the gear 164 towards the enlarged end of the radially outer surface 162 of the flange 160. This configuration prevents the gear 164 from walking or moving axially along the flange 160 during operation of the engine assembly 12. In particular, the walking of the gear 164 is prevented because the force generated between the pair of helical gear teeth is less than the press fit force needed to move the gear 164 along the radially outer surface 162 of the flange 160.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed is:

1. A crankshaft assembly, comprising:

a crankshaft body extending along an axis of rotation including:

a plurality of bearing journals mutually coaxial with the axis of rotation and spaced from each other along a length of the crankshaft body;

a plurality of crankpins spaced from each other along the length of the crankshaft body and axially offset from the axis of rotation;

a plurality of crank webs projecting radially from the axis of rotation and interconnecting the bearing journals and the crankpins; and a flange extending from a distal end of the crankshaft body having a conical oil pump gear engaging surface, wherein the flange includes a first axially facing surface and a second axially facing surface and the first axially facing surface and the second axially facing surface face opposite axial directions.

2. The crankshaft assembly of claim 1, wherein the conical oil pump gear engaging surface tapers towards the distal end of the crankshaft body.

3. The crankshaft assembly of claim 2, wherein the conical oil pump gear engaging surface extends between five and fifteen degrees relative to the axis of rotation.

4. The crankshaft assembly of claim 2, wherein the conical oil pump gear engaging surface extends from the first axially facing surface to the second axially facing surface.

5. The crankshaft assembly of claim 2, including an oil pump gear having a conical flange engaging surface complementary to the conical oil pump gear engaging surface.

6. The crankshaft assembly of claim 5, wherein the oil pump gear includes helical teeth extending from a radially outer surface of the oil pump gear and the helical teeth on the oil pump gear are right direction helical teeth.

7. The crankshaft assembly of claim 2, including an oil pump gear having a conical flange engaging surface complementary to the conical oil pump gear engaging surface, wherein the oil pump gear includes helical teeth extending from a radially outer surface of the oil pump gear and the conical oil pump gear engaging surface extends from the first axially facing surface to the second axially facing surface.

8. The crankshaft assembly of claim 7, wherein the first axial face at least partially defines a trough with one of the plurality of bearing journals, the second axial surface defines a distal end of the crankshaft body, and a central opening extends through the distal end of the crankshaft body and is in an axially overlapping configuration with the conical oil pump gear engaging surface relative to the axis of rotation.

9. The crankshaft assembly of claim 8, wherein the first axial facing surface defines a proximal edge of the conical oil pump gear engaging surface and the second axial facing surface defines a distal edge of the conical oil pump gear engaging surface.

10. The crankshaft assembly of claim 1, wherein each of the plurality of bearing journals define a journal cavity therein, each of the plurality of crankpins define a crankpin cavity therein, and each of the plurality of crank webs define a web cavity therein.

11. A method of manufacturing a crankshaft assembly, the method comprising:

forming a crankshaft body along an axis of rotation, the crankshaft body including:

a plurality of bearing journals mutually coaxial with the axis of rotation and spaced from each other along a length of the crankshaft body;

a plurality of crankpins spaced from each other along the length of the crankshaft body and axially offset from the axis of rotation;

a plurality of crank webs projecting radially from the axis of rotation and interconnecting the bearing journals and the crankpins; and a flange extending from a distal end of the crankshaft body having a conical oil pump gear engaging surface, wherein the flange includes a first axially facing surface and a second axially facing surface and the first axially facing surface and the second axially facing surface face opposite axial directions.

12. The method of claim 11, wherein the conical oil pump gear engaging surface tapers towards the distal end of the crankshaft body.

13. The method of claim 12, wherein the conical oil pump gear engaging surface extends between five and fifteen degrees relative to the axis of rotation.

14. The method of claim 12, wherein the conical oil pump gear engaging surface extends from the first axially facing surface to the second axially facing surface and the first axial facing surface defines a proximal edge of the conical oil pump gear engaging surface and the second axial facing surface defines a distal edge of the conical oil pump gear engaging surface.

15. The method of claim 14, including an oil pump gear having a conical flange engaging surface in engagement with the oil pump conical gear engaging surface, wherein the oil pump gear includes right direction helical teeth configured to direct a force from an oil pump in a proximal direction towards the first axial facing surface and the oil pump gear is spaced from the first axial facing surface and the second axial facing surface.

16. A motor vehicle comprising:

a vehicle body;

a plurality of road wheels rotatably attached to the vehicle body; and an internal combustion engine (ICE) assembly attached to the vehicle body and operable to output engine torque to one or more of the road wheels to thereby propel the motor vehicle, the ICE assembly having an engine block defining a plurality of cylinder bores, a plurality of pistons each reciprocally movable within a respective one of the cylinder bores, and a crankshaft assembly including:

a crankshaft body extending along an axis of rotation;

a plurality of bearing journals mutually coaxial with the axis of rotation and spaced from each other along a length of the crankshaft body;

a plurality of crankpins spaced from each other along the length of the crankshaft body and axially offset from the axis of rotation;

a plurality of crank webs projecting radially from the axis or rotation and interconnecting the bearing journals and the crankpins; and a flange extending from a distal end of the crankshaft body having a conical oil pump gear engaging surface, wherein the flange includes a first axially facing surface and a second axially facing surface and the first axially facing surface and the second axially facing surface face opposite axial directions.

17. The motor vehicle of claim 16, wherein the conical oil pump gear engaging surface tapers towards the distal end of the crankshaft body.

18. The motor vehicle of claim 17, including an oil pump gear having a conical flange engaging surface in engagement with the conical oil pump gear engaging surface, wherein the oil pump gear includes helical teeth extending from a radially outer surface of the oil pump gear, the conical oil pump gear engaging surface extending from the first axially facing surface to the second axially facing surface, the oil pump gear is spaced from the first axial facing surface and the second axial facing surface, and the conical gear engaging surface extends between five and fifteen degrees relative to the axis of rotation.

19. The motor vehicle of claim 17, wherein the conical oil pump gear engaging surface extends from the first axially facing surface to the second axially facing surface and the first axial facing surface defines a proximal edge of the conical oil pump gear engaging surface and the second axial facing surface defines a distal edge of the conical oil pump gear engaging surface.

20. The motor vehicle of claim 19, including an oil pump gear having a conical flange engaging surface complementary to the conical oil pump gear engaging surface, wherein the oil pump gear includes right direction helical teeth configured to direct a force from an oil pump in a proximal direction towards the first axial facing surface.

* * * * *